(12) United States Patent
Nelson

(10) Patent No.: US 6,604,893 B2
(45) Date of Patent: Aug. 12, 2003

(54) CUTTING INSERT WITH WIPER

(75) Inventor: Joseph V. Nelson, Greensburg, PA (US)

(73) Assignee: Kennametal Inc., Latrobe, MA (US)

( * ) Notice: Subject to any disclaimer, the term of this patent is extended or adjusted under 35 U.S.C. 154(b) by 0 days.

(21) Appl. No.: 09/917,078

(22) Filed: Jul. 27, 2001

(65) Prior Publication Data

US 2003/0021641 A1 Jan. 30, 2003

(51) Int. Cl.⁷ .................... B23B 27/14; B26D 1/12
(52) U.S. Cl. .......................... 407/35; 407/114
(58) Field of Search .................. 407/35, 43, 46, 407/53, 113, 114, 115, 116

(56) References Cited

U.S. PATENT DOCUMENTS

| | | |
|---|---|---|
| 4,294,566 A | 10/1981 | Boone |
| 4,475,851 A | 10/1984 | Hale |
| 4,597,695 A | 7/1986 | Johnson |
| 4,616,962 A | 10/1986 | Ushijima et al. |
| 4,812,087 A | 3/1989 | Stashko |
| 5,020,944 A | 6/1991 | Pawlik |
| 5,028,175 A | 7/1991 | Pawlik |
| 5,067,858 A | 11/1991 | Cook |
| 5,074,720 A | 12/1991 | Loqvist et al. |
| 5,145,294 A | 9/1992 | Flueckiger |
| 5,158,401 A | 10/1992 | Pawlik |
| 5,330,295 A | 7/1994 | Pawlik |
| 5,366,325 A | 11/1994 | Stashko |
| 5,586,843 A | 12/1996 | Minicozzi |
| 5,597,271 A * | 1/1997 | Men et al. ............ 407/113 |
| 5,628,590 A * | 5/1997 | Beeghly et al. ........ 407/114 |
| 5,720,583 A | 2/1998 | Bohnet et al. |
| 5,727,911 A | 3/1998 | Satran et al. |
| 5,803,674 A * | 9/1998 | Satran et al. ......... 407/113 |
| 5,810,519 A * | 9/1998 | Vogel et al. .......... 407/114 |
| 5,827,016 A | 10/1998 | Strand |
| 5,876,160 A * | 3/1999 | Johnson .............. 407/113 |
| 5,967,706 A | 10/1999 | Hughes, Jr. |
| 5,971,672 A * | 10/1999 | Hansson ............. 407/113 |
| 6,050,752 A | 4/2000 | DeRoche |
| 6,056,484 A | 5/2000 | Mitchell et al. |
| 6,186,705 B1 * | 2/2001 | Kumar et al. ......... 407/114 |
| 6,234,726 B1 * | 5/2001 | Okada et al. ......... 407/114 |
| 6,530,726 B2 * | 3/2003 | Nelson ............... 407/114 |
| 2002/0090272 A1 * | 7/2002 | Waggle .............. 407/114 |

* cited by examiner

*Primary Examiner*—A. L. Wellington
*Assistant Examiner*—Brian D. Walsh
(74) *Attorney, Agent, or Firm*—Larry R. Meenan

(57) ABSTRACT

A cutting insert includes an upper, lower and side surfaces and at least one leading cutting edge and a trailing wiper edge formed at an intersection of the upper surface with the side surface. A corner separates the leading cutting edge from the trailing wiper edge. The top surface includes a plurality of planar rake surfaces that extend inwardly and downwardly toward a seating surface of the insert. The top surface also includes a plurality of chip deflecting surfaces extending inwardly and upwardly toward the seating surface to form a transition zone between adjacent rake surfaces. The rake surfaces form a land angle with respect to a line perpendicular to the leading cutting edges. Additionally, a back wall surface extends upwardly from the rake surfaces to the seating surface to form a transition zone between the rake surfaces and the seating surface.

16 Claims, 4 Drawing Sheets

CUTTING INSERT WITH WIPER

BACKGROUND OF THE INVENTION

1. Field of the Invention

The present invention pertains to an insert to be used in cutting tools for chip-forming machining operations. More particularly, the present invention relates to a multiple purpose, indexable, cutting insert having a leading cutting edge and a trailing wiper edge for semi-finishing and finishing in face, chamfer, periphery, and pocket milling applications.

2. Description of the Related Art

Indexable cutting inserts are available in various shapes. One of the most common inserts is square and includes four cutting edges. Such an insert is especially useful in cases where it is necessary to mill a square or 90-degree shoulder in the workpiece being cut.

Octagonal inserts with eight cutting edges are also widely used. Adjacent cutting edges of such an insert extend at a 45-degree angle (commonly called a lead angle) relative to one another. Octagonal inserts are particularly advantageous in that a single insert possesses a relatively large number of alternately usable cutting edges.

However, the cutting edges of the conventional octagonal insert, for example, may produce a relatively rough surface on the workpiece as the result of the milling operation. Thus, it may be necessary to subject the workpiece to a second milling operation to produce a smoother surface as desired by the customer.

The inventor of the present invention has recognized that the requirement of a second milling operation increases the costs associated with the milling operation and decreases productivity.

SUMMARY OF THE INVENTION

To solve these and other problems, an object of the invention is to provide an indexable cutting insert for use in a cutting tool having a leading cutting edge for coarse cutting operations and a trailing wiper edge for fine cutting operations.

It is another object of the invention to provide an indexable cutting insert having a rake surface and deflecting surface for effective chip control.

In one aspect of the invention, an indexable cutting insert comprises a polygonal body of wear resistant material. The body includes a center, top and bottom surfaces, and a plurality of side surfaces between the top and bottom surfaces. A plurality of leading cutting edges is formed at an intersection of the plurality of side surfaces and the top surface. Similarly, a plurality of wiper edges is formed at the intersection of the plurality of side surfaces and the top surface. A corner separates each leading cutting edge and each wiper edge. For a cutting operation, the insert engages a workpiece using one of the leading cutting edges for coarse cutting operations and one of the wiper edges for fine cutting operations.

In another aspect of the invention, an assembly of a toolholder and an indexable cutting insert being mounted within a seat in the toolholder. The cutting insert comprises a polygonal body of wear resistant material. The body includes a center, top and bottom surfaces, and a plurality of side surfaces between the top and bottom surfaces. A plurality of leading cutting edges is formed at an intersection of the plurality of side surfaces and the top surface. Similarly, a plurality of wiper edges is formed at the intersection of the plurality of side surfaces and the top surface. A corner separates each leading cutting edge and each wiper edge. For a cutting operation, the insert engages a workpiece using one of the leading cutting edges for coarse cutting operations and one of the wiper edges for fine cutting operations.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

In the drawings.

DESCRIPTION OF THE PREFERRED EMBODIMENT

Figure 1:
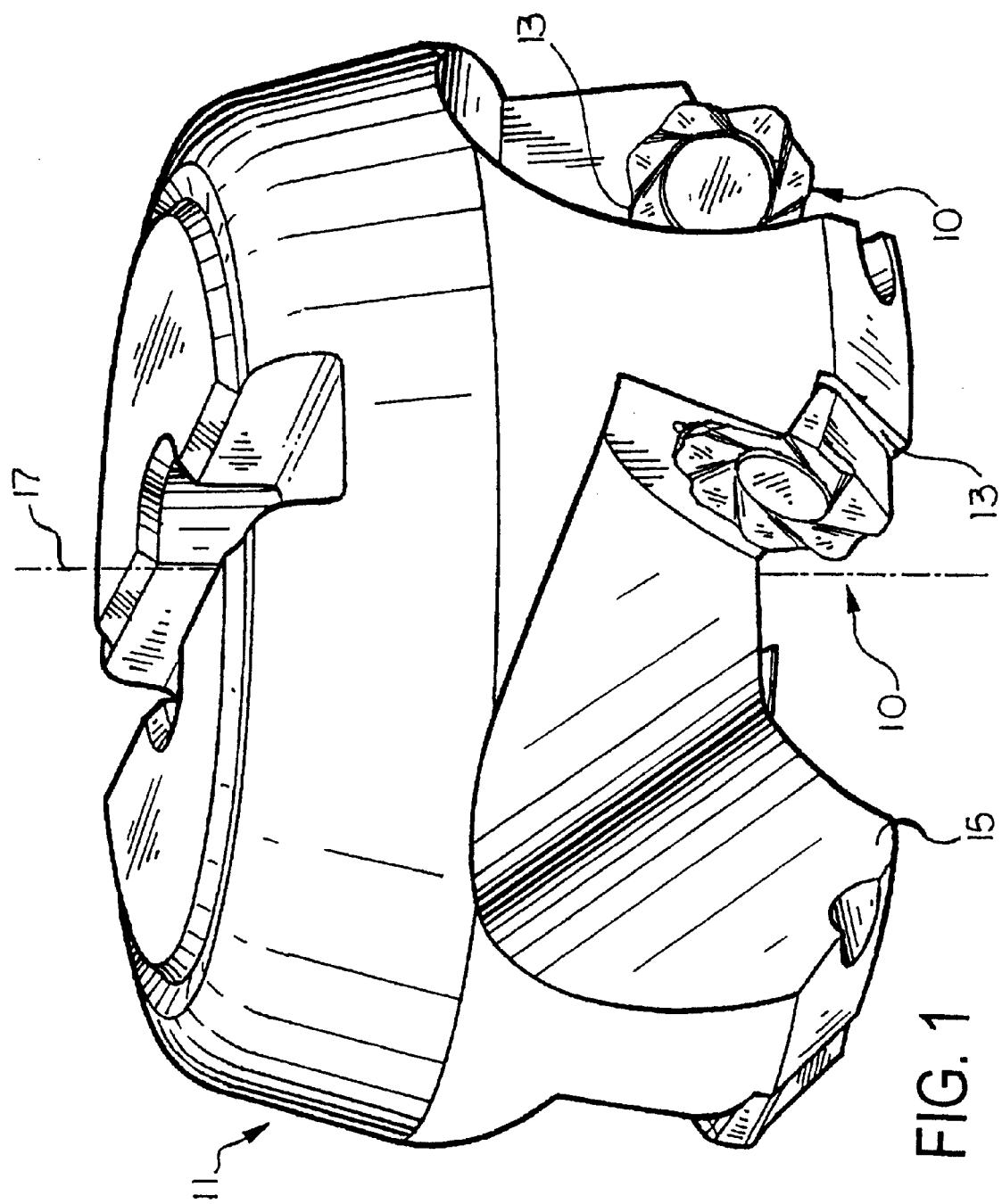
FIG. 1 is an isometric view of a cutting insert in accordance with the subject invention mounted within a cutter body.

The cutting insert of the present invention is shown in FIG. 1 and indicated generally by reference number 10. In one application for the cutting insert 10, the insert may be mounted within a rotating milling cutter body 11. It should be understood that utilizing the cutting insert 10 in such a body 11 should not be limiting and the subject insert may also be used in other cutting bodies, such as those utilized in turning or drilling operations.

However, as shown in FIG. 1, the milling cutter body 11 includes a plurality of circumferentially spaced insert pockets 13 formed around the cutting end 15 of the milling cutter body 11. The milling cutter body 11 is designed to be rotatably driven about a central longitudinal axis 17. As the milling cutter body is rotated, the cutting insert 10 acts to engage a workpiece (not shown).

Figure 2:
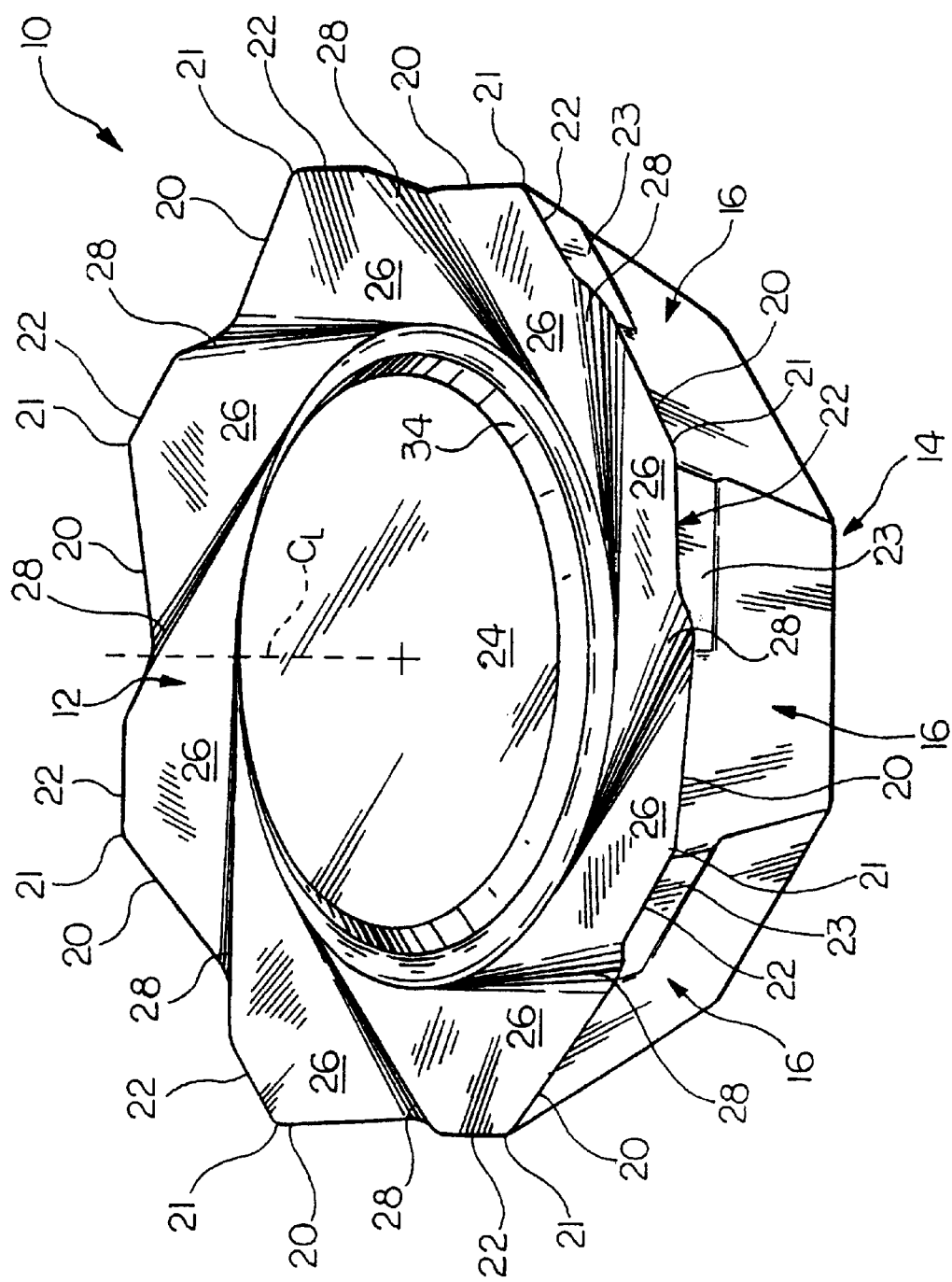
FIG. 2 is an isometric view of the cutting insert in accordance with the invention.
Figure 4:
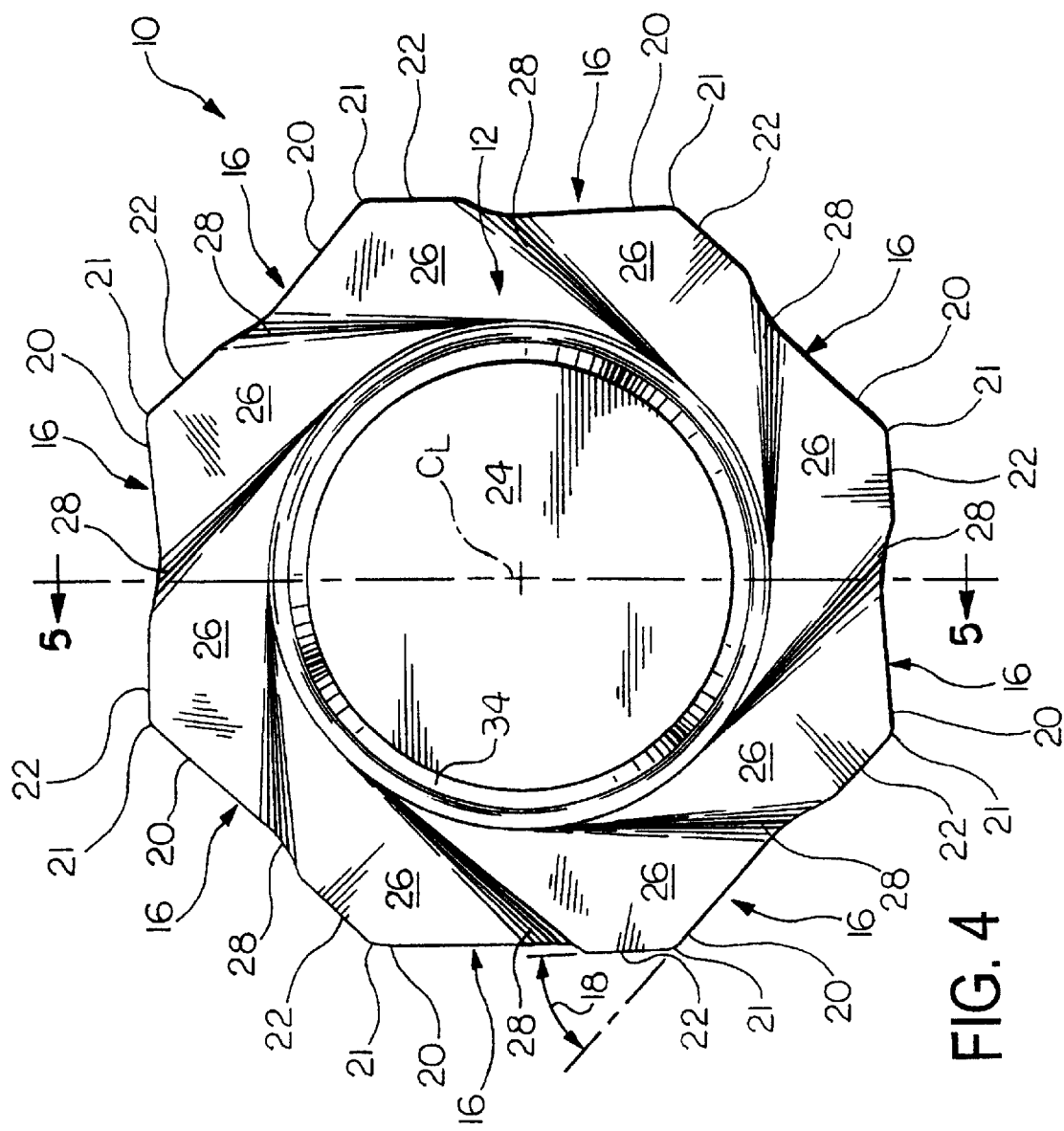
FIG. 4 is a top plan view of the cutting insert in accordance with the invention.

FIG. 2 illustrates an isometric view of the cutting insert 10 removed from the milling cutter body 11. The insert has a polygonal body of wear-resistant material. Although other geometric shapes are possible, the insert 10 is of a generally octagonal shape that is symmetric about a central axis $C_L$, and includes a top surface 12, a bottom surface 14 and a plurality of side surfaces 16. As best shown in FIG. 4, each side surface 16 has an angle 18 of approximately 45° with respect to an adjacent side surface 16. Additionally, each side surface 16 is tapered to form an angle 17 with a line perpendicular to the plane P. This angle 17 is referred to as the facet clearance angle and may have a value of between 0° and 30° and as shown has an angle of approximately 25°, as best shown in FIG. 5.

Referring now to FIG. 2, the insert 10 includes a plurality of leading cutting edges 20 and a plurality of trailing wiper edges 22 formed at the intersection between the top surface 12 and each side surface 16. A corner 21 separates each leading cutting edge 20 from each trailing wiper edge 22. Preferably, each corner 21 has a radius in the range of approximately 0.5 to 1.0 mm. However, the invention can be practiced with any desirable corner radius. It will be appreciated that each of the cutting edges 20 can be indexed into an active position and effectively utilized in a cutting tool (not shown). Thus, the octagonal milling insert 10 of the invention can be indexed eight times, unlike conventional rectangular or square cutting inserts.

To facilitate the seating of the insert 10 in the cutting tool, each side surface 16 of the insert 10 may include a substantially planar side seating surface 23 protruding from each side surface 16 beneath the wiper edge 22. The side seating surface 23 may also extend onto the corner 21. The lower edge of the side seating surface 23 prevents movement of the insert 10 when the side surface 16 engages the cutting tool during cutting operations. Preferably, two side surfaces 16 should engage the cutting tool when the insert 10 is properly indexed in the cutting tool.

Figure 5:
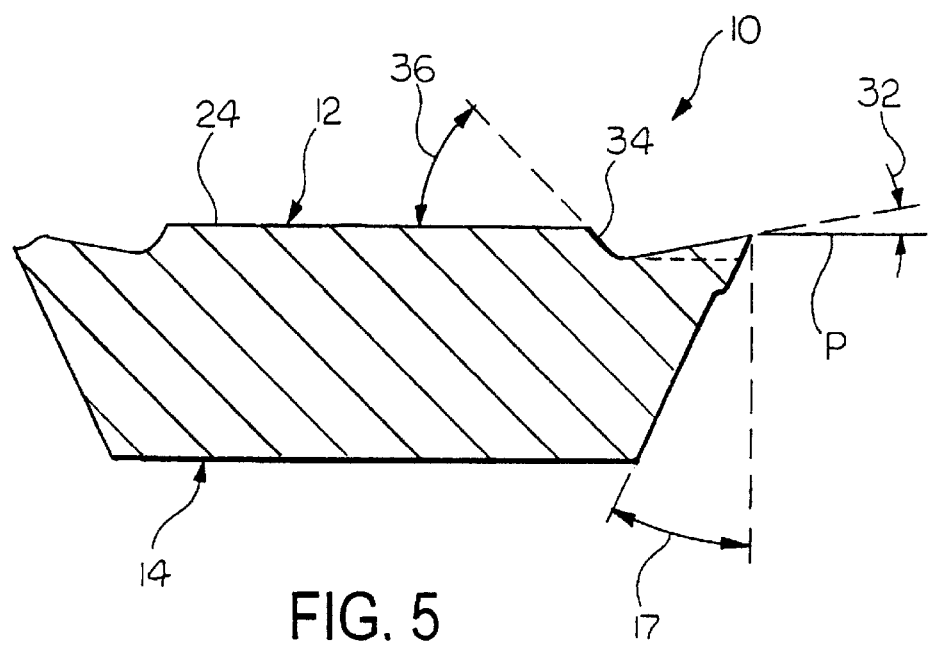
FIG. 5 is a section view of the cutting insert taken along line 5—5 of FIG. 4.

As best shown in FIG. 5, the top surface 12 of the insert 10 is formed with a centrally disposed, substantially planar seating surface 24 which may be substantially coplanar with the leading cutting edges 20, or alternatively project above the leading cutting edges 20 by a height that is preferably in the range of 0.05 mm to 0.40 mm. The seating surface 24 serves as an insert support-seating surface when the insert 10 is positioned in the cutting tool. Likewise, the bottom surface 14 forms a substantially planar seating surface.

Figure 3:
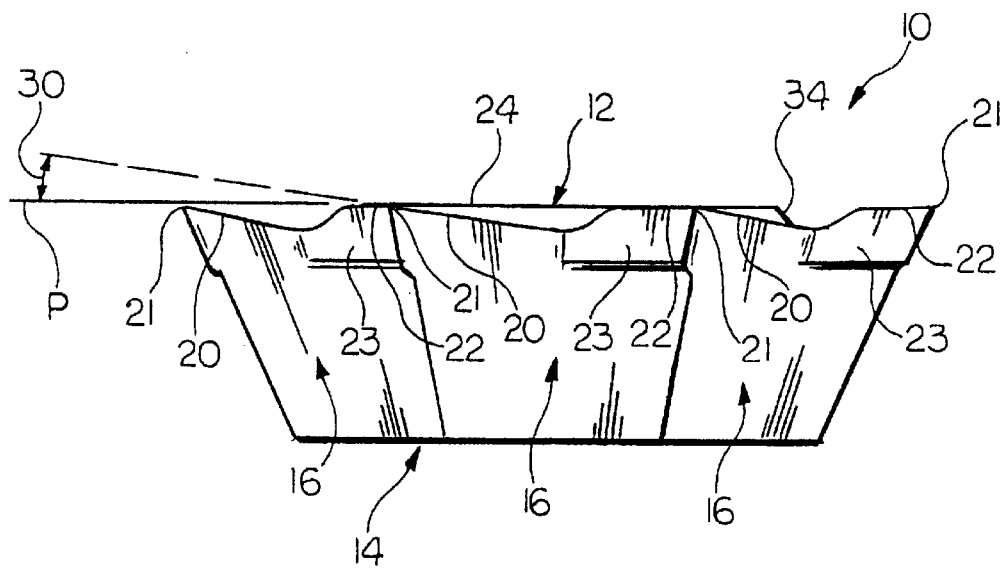
FIG. 3 is a side view of the cutting insert in accordance with the invention.

The top surface 12 includes a plurality of rake surfaces 26, which may be planar, extending inwardly and downwardly from the leading cutting edge 20, the corner 21 and the trailing wiper edge 22 toward the seating surface 24 of the insert 10. The top surface 12 also includes a plurality of deflecting surfaces 28 extending inwardly and upwardly toward the seating surface 24 from the leading cutting edge 20 to form a transition zone between adjacent rake surfaces 26. The deflecting surfaces 28 extend upwardly at a deflection angle 30 with a line perpendicular to the plane P of the leading cutting edges 20, as best shown in FIG. 2. The deflection angle 30 may be between 1° and 60° and in FIG. 3 is approximately 30°. The rake surfaces 26 and deflecting surfaces 28 form a flow pattern for efficient chip ejection.

Referring now to FIG. 5, the rake surfaces 26 form a land angle 32 with a line perpendicular to the plane P. The land angle 32 may be between approximately 1° and 30° and in FIG. 5 is approximately 11°. Additionally, a back wall surface 34 forms a transition zone between the rake surfaces 26 and the seating surface 24. The back wall surface 34 extends upwardly from the rake surfaces 26 to the seating surface to form a back wall angle 36 with a line perpendicular to the plane P. The back wall angle 36 may be between 1° and 60° and in FIG. 5 is approximately 45°.

During a cutting operation, the insert 10 engages a workpiece (not shown), using for example, the leading cutting edge 20 for providing the coarse cutting operation and the wiper edge 22 for providing the fine cutting operation. The depth of the penetration into the workpiece is limited to the length of the leading cutting edge 20 below the wiper edge 22. As the leading cutting edge 20 penetrates the workpiece, material is removed from the workpiece and it is directed toward the center of the insert 10 along rake surfaces 26. When the material contacts the rake surfaces 26, the material may curl to produce an acceptable chip. However, if contact with the rake surfaces 26 is not sufficient to form an acceptable ship, then the material will continue and will strike the deflecting surfaces 28. This contact will force the material to abruptly change direction upwardly along the deflecting surfaces 28. Additionally, the material will be directed by the deflecting surfaces 28 toward the back wall surface 34, which also causes the material to abruptly change direction upwardly along the back wall surface 34.

For the purposes of this discussion, a cutting insert having a geometry identified as an octagon is presented. However, it should be realized that the configuration of this invention should not be limited to a square and that other geometric shapes may be substituted, for example, a square, an 80° diamond (which has two 80° corners and two 100° corners), a 55° diamond (which has two 55° corners and two 125° corners), a triangle or a trigon.

The patents and publications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An indexable cutting insert, comprising:
   a polygonal body of wear resistant material, the body including a center, top and bottom surfaces, and a plurality of side surfaces between the top and bottom surfaces;
   a plurality of leading cutting edges formed at an intersection of the plurality of side surfaces and the top surface;
   a plurality of wiper edges formed at the intersection of the plurality of side surfaces and the top surface; and
   a corner separating each leading cutting edge and each wiper edge,
   wherein for a cutting operation the insert engages a workpiece using one of the leading cutting edges for coarse cutting operations and one of the wiper edges for fine cutting operations,
   wherein the top surface includes a rake surface extending inwardly from each leading cutting edge toward the center of the insert body, and
   wherein the top surface includes a deflecting surface extending upwardly and inwardly toward the center region of the insert body and away from the leading cutting edge to form a transition zone between adjacent rake surfaces.

2. The insert according to claim 1, wherein the rake surface forms a land angle with respect to a line perpendicular to each leading cutting edge.

3. The insert according to claim 2, wherein the land angle is between approximately 1° and 30°.

4. The insert according to claim 3, wherein the land angle is approximately 11°.

5. The insert according to claim 1, wherein the deflecting surface extends upwardly at a deflection angle with respect to a line perpendicular to each leading cutting edge.

6. The insert according to claim 5, wherein the deflection angle is between 1° and 60°.

7. The insert according to claim 6, wherein the deflection angle is approximately 30°.

8. The insert according to claim 1, wherein the top surface further includes a deflecting surface extending upward toward the center of the insert body.

9. The insert according to claim 8, wherein the deflecting surface extends upwardly at a back wall angle with respect to a line perpendicular to the leading cutting edge.

10. The insert according to claim 9, wherein the back wall angle is between 1° and 60°.

11. The insert according to claim 10, wherein the back wall angle is approximately 45°.

12. An assembly of a toolholder and an indexable cutting insert mounted within a seat in the toolholder, the cutting insert comprising:

a polygonal body of wear resistant material, the body including a center, top and bottom surfaces, and a plurality of side surfaces between the top and bottom surfaces;

a plurality of leading cutting edges formed at an intersection of the plurality of side surfaces and the top surface;

a plurality of wiper edges formed at the intersection of the plurality of side surfaces and the top surface; and a corner separating each leading cutting edge and each wiper edge, wherein for a cutting operation the insert engages a workpiece using one of the leading cutting edges for coarse cutting operations and one of the wiper edges for fine cutting operations, wherein the top surface includes a rake surface extending inwardly from each leading cutting edge toward the center of the insert body, and wherein the top surface further includes a deflecting surface extending upwardly and inwardly toward the center region of the insert body and away from the leading cutting edge to form a transition zone between adjacent rake surfaces.

13. The assembly according to claim 12, wherein the rake surface forms a land angle with respect to a line perpendicular to each leading cutting edge.

14. The assembly according to claim 13, wherein the land angle is between approximately 1° and 30°.

15. The assembly according to claim 14, wherein the land angle is approximately 11°.

16. The assembly according to claim 12, wherein the top surface further includes a back wall surface extending upwardly toward the center region of the insert body.

* * * * *